(12) United States Patent
Warita et al.

(10) Patent No.: US 7,262,582 B2
(45) Date of Patent: Aug. 28, 2007

(54) SWITCHING POWER SUPPLY CIRCUIT AND ELECTRONIC APPARATUS PROVIDED THEREWITH

(75) Inventors: Hirohisa Warita, Kitakatsuragi-gun (JP); Atsushi Kanamori, Ikoma-gun (JP); Katsumi Inaba, Tondabayashi (JP); Tsutomu Satoh, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 134 days.

(21) Appl. No.: 11/248,187

(22) Filed: Oct. 13, 2005

(65) Prior Publication Data

US 2006/0082352 A1   Apr. 20, 2006

(30) Foreign Application Priority Data

Oct. 14, 2004   (JP) .............................. 2004-299572

(51) Int. Cl.
*G05F 1/10* (2006.01)
(52) U.S. Cl. ...................... 323/222; 323/901; 363/61; 363/65
(58) Field of Classification Search ........ 323/282–284, 323/222, 901, 908, 267; 363/363.12, 71, 363/49, 65, 58
See application file for complete search history.

(56) References Cited

U.S. PATENT DOCUMENTS 6,201,674 B1 * 3/2001 Warita et al. ................. 361/18
6,624,619 B2 * 9/2003 Fujita et al. .................. 323/288
6,650,555 B2 * 11/2003 Suzuki et al. .................. 363/60
6,657,876 B2 * 12/2003 Satoh ............................ 363/60
7,012,412 B2 * 3/2006 Kanamori et al. ........... 323/283

FOREIGN PATENT DOCUMENTS

JP        11-069793 A       3/1999

* cited by examiner

*Primary Examiner*—Rajnikant B. Patel
(74) *Attorney, Agent, or Firm*—Birch, Stewart, Kolasch & Birch, LLP

(57) ABSTRACT

In a switching power supply circuit, completion of discharging of a capacitance provided in a soft-start circuit requires a period longer than a cycle with which an activating/deactivating portion switches switching control operation of a driving portion (which performs switching control to turn on/off a switching device provided in a stepping-up DC-DC converter) between an activated state and a deactivated state. Moreover, the soft-start circuit is prevented from performing soft-start operation until discharging of the capacitance is completed. Furthermore, the activating/deactivating portion prevents the switching control operation of the driving portion from being switched from the deactivated state to the activated state from a time point that constant voltage feeding operation of a constant voltage portion (which feeds, to a comparing portion that sends an output signal to the driving portion, a constant voltage as the drive voltage) is switched from the deactivated state to the activated state until a predetermined period elapses.

17 Claims, 12 Drawing Sheets

SWITCHING POWER SUPPLY CIRCUIT AND ELECTRONIC APPARATUS PROVIDED THEREWITH

This nonprovisional application claims priority under 35 U.S.C. § 119(a) on Patent Application No. 2004-299572 filed in Japan on Oct. 14, 2004, the entire contents of which are hereby incorporated by reference.

BACKGROUND OF THE INVENTION

1. Field of the Invention

The present invention relates to a switching power supply circuit that steps up the input voltage from a direct-current source and then feeds it to a load. More particularly, the present invention relates to a switching power supply circuit that activates/deactivates stepping-up operation according to an external signal.

2. Description of Related Art

In recent years, white light-emitting diodes that are excellent in durability, luminous efficiency, and space-saving, etc., have come to be used as one of the illumination light sources (backlights or frontlights) of liquid crystal display devices (LCDs) incorporated in electronic apparatuses such as cellular phones, PDAs (personal digital assistants), and digital cameras. This white light-emitting diode requires a relatively high forward direction voltage to emit light, and, in general, as an illumination light source, a plurality of white light-emitting diodes are used and connected in series to make their brightness equal. Thus, driving the white light-emitting diode as an illumination light source requires a direct voltage higher than the direct voltage fed from the battery incorporated in the electronic apparatus.

For this reason, a stepping-up switching power supply circuit is used as a circuit for driving the white light-emitting diode. FIG. 11A shows an example of the configuration of a conventional stepping-up switching power supply circuit. The switching power supply circuit shown in FIG. 11A is composed of an input capacitor 2, a coil 3, a diode 4 that is a rectifying device, an output capacitor 5, an output current detection resistance R1, and a stepping-up chopper regulator 10 that takes the form of a single IC package and performs stepping-up operation by controlling the charge and discharge of energy to the coil 3. The switching power supply circuit shown in FIG. 11A steps up the direct voltage fed from a direct-current source 1 such as a lithium-ion battery, then feeds the stepped-up voltage to the loads, namely, six white light-emitting diodes LED1 to LED6, and thus drives them. Note that a power source switch (not shown) is provided between the direct-current source 1 and the switching power supply circuit. When the power source switch is on, the direct voltage Vin is fed from the direct-current source 1 to the switching power supply circuit; when the power source switch is off, the direct voltage Vin is not fed from the direct-current source 1 to the switching power supply circuit.

The direct-current source 1 has the negative terminal connected to the ground, and has the positive terminal that is connected to the ground via the input capacitor 2 and is also connected to the one end of the coil 3. The other end of the coil 3 is connected to the anode of the diode 4, and the cathode of the diode 4 is connected to the ground via the output capacitor 5. The white light-emitting diodes LED1 to LED6 and the output current detection resistance R1 are connected in series to form a series circuit, and this series circuit is connected in parallel with the output capacitor 5.

The stepping-up chopper regulator 10 is provided with, as the terminals for external connection, a power supply terminal $T_{VIN}$, a ground power supply terminal $T_{GND}$, an output voltage monitor terminal $T_{VO}$, a feedback terminal $T_{FB}$, a switch terminal $T_{VSW}$, and a control terminal $T_{CTRL}$. The power supply terminal $T_{VIN}$ is connected to the positive terminal of the direct-current source 1, and the ground power supply terminal $T_{GND}$ is connected to the ground. With these terminals, the stepping-up chopper regulator 10 can operate from the direct-current source 1. The switch terminal $T_{VSW}$ is connected to the node at which the coil 3 and the diode 4 are connected together, the output voltage monitor terminal $T_{VO}$ is connected to the cathode of the diode 4, and the feedback terminal $T_{FB}$ is connected to the node at which the white light-emitting diode LED6 and the output current detection resistance R1 are connected together. The control terminal $T_{CTRL}$ receives a brightness adjusting signal, which will be described below.

Next, the internal configuration of the stepping-up chopper regulator 10 will be described. The stepping-up chopper regulator 10 is provided with N-channel MOSFETs 11 and 12 (hereinafter referred to as Nch transistors), a drive circuit 13, a current detection comparator 14, an oscillation circuit 15, an amplifier 16, a PWM comparator 17, an error amplifier 18, a reference power source 19, resistances R2 to R4, a soft-start circuit 20, an on/off circuit 21, an overheating detection circuit 22, an overvoltage detection circuit 23, a constant voltage circuit 24, and a switch 25.

When the switch 25 is on, the constant voltage circuit 24 converts the direct voltage Vin from the power supply terminal $T_{VIN}$ into a voltage having a predetermined value, and then feeds the converted voltage to the PWM comparator 17 and the error amplifier 18 as the drive voltage. When the switch 25 is on, the direct voltage Vin is fed, as the drive voltage, to the other circuits constituting the stepping-up chopper regulator 10.

The switch 25 is provided between the power supply terminal $T_{VIN}$ and the signal receiving side of the constant voltage circuit 24. When a high level signal is fed to the control terminal, the switch 25 is turned on; when a low level signal is fed to the control terminal, the switch 25 is turned off. The brightness adjusting signal received from the outside by the control terminal $T_{CTRL}$ is fed to the control terminal of the switch 25. Therefore, when the brightness adjusting signal takes a low level, electric power is not fed to the circuits of the stepping-up chopper regulator 10. This reduces the electric power consumption to near zero. This advantageously contributes to low electric power consumption.

The drains of the Nch transistor 11 and the Nch transistor 12 are both connected to the switch terminal $T_{VSW}$, and the gates of the Nch transistor 11 and the Nch transistor 12 are both connected to the drive circuit 13. The source of the Nch transistor 12 is directly connected to the ground, and the source of the Nch transistor 11 is connected to the ground via the resistance R2. This makes the ratio of the drain current of the Nch transistor 11 to that of the Nch transistor 12 equal to the ratio of the gate width/gate length of the Nch transistor 11 to that of the Nch transistor 12.

The ends of the resistance R2 are respectively connected to the two input terminals of the current detection comparator 14. The output of the current detection comparator 14 and one output of the oscillation circuit 15 are added together by the amplifier 16, and their sum is fed to the inverting input terminal of the PWM comparator 17. The output of the PWM comparator 17 and the other output of the oscillation circuit 15 are fed to the drive circuit 13.

The output of the error amplifier 18 is fed to the non-inverting input terminal of the PWM comparator 17, and the non-inverting input terminal of the error amplifier 18 is connected to the feedback terminal $T_{FB}$. The inverting input terminal of the error amplifier 18 is connected to one end of the resistance R3 and to one end of the resistance R4. The other end of the resistance R4 is connected to the ground, and the other end of the resistance R3 is connected to the positive terminal of the reference power source 19. The negative terminal of the reference power source 19 is connected to the ground.

The output of the soft-start circuit 20 is fed to the node at which the non-inverting input terminal of the PWM comparator 17 and the output terminal of the error amplifier 18 are connected together, and the outputs of the on/off circuit 21, the overheating detection circuit 22, and the overvoltage detection circuit 23 are fed to the drive circuit 13. The brightness adjusting signal received from the outside by the control terminal $T_{CTRL}$ is fed to the soft-start circuit 20 and the on/off circuit 21. The output voltage Vout is fed through the output voltage monitor terminal $T_{VO}$ to the overvoltage detection circuit 23.

Next, the operation of the switching power supply circuit having the configuration shown in FIG. 11A will be described. The switching power supply circuit shown in FIG. 11A causes, by making the drive circuit 13 turn on/off the Nch transistor 12, the output voltage Vout obtained by stepping up the input voltage Vin from the direct-current source 1 to appear across the output capacitor 5 and thus drives the white light-emitting diodes LED1 to LED6.

Specifically, when the drive circuit 13 applies a predetermined gate voltage to the gate of the Nch transistor 12 and the Nch transistor 12 is on, a current flows from the direct-current source 1 to the coil 3. As a result, energy is accumulated in the coil 3. On the other hand, when the drive circuit 13 does not apply a predetermined gate voltage to the gate of the Nch transistor 12 and the Nch transistor 12 is off, the accumulated energy is released, resulting in a back electromotive force generated in the coil 3. The back electromotive force generated in the coil 3 is added to the input voltage Vin of the direct-current source 1, and then charges through the diode 4 the output capacitor 5. By repeating the operations described above, stepping-up operation is performed, resulting in appearance of the output voltage Vout across the output capacitor 5. This output voltage Vout makes the output current Iout flow through the white light-emitting diodes LED1 to LED6, and thereby makes the white light-emitting diodes LED1 to LED6 emit light.

Then, a feedback voltage Vfb obtained by multiplying a current value of the output current Iout by a resistance value of the output current detection resistance R1 is fed through the feedback terminal $T_{FB}$ to the non-inverting input terminal of the error amplifier 18, and then compared with a reference voltage Vref to be fed to the inverting input terminal of the error amplifier 18. With this comparison, a voltage according to the difference between the feedback voltage Vfb and the reference voltage Vref appears in the output of the error amplifier 18. This voltage is fed to the non-inverting input terminal of the PWM comparator 17. Note that the reference voltage Vref is a voltage obtained by dividing the output voltage of the reference power source 19 by the resistances R3 and R4.

A signal proportional to the current that flows through, when the Nch transistor 11 is turned on, the resistance R2 and a sawtooth waveform signal outputted from the oscillation circuit 15 are added together and then amplified by the amplifier 16. The resultant signal is inputted to the inverting input terminal of the PWM comparator 17, and then compared with the output voltage level of the error amplifier 18 by the PWM comparator 17. As a result, when the output voltage level of the error amplifier 18 is higher than the output signal level of the amplifier 16, the PWM output of the PWM comparator 17 takes a high level. On the other hand, when the output voltage level of the error amplifier 18 is lower than the output signal level of the amplifier 16, the PWM output of the PWM comparator 17 turns to a low level.

Upon receiving the PWM output of the PWM comparator 17, the drive circuit 13 feeds a pulse signal having a duty according to the received PWM output to the gates of the Nch transistors 11 and 12 so as to turn them on/off. Specifically, when the PWM output of the PWM comparator 17 takes a high level, the drive circuit 13 starts, at the beginning of each cycle of the sawtooth waveform signal outputted from the oscillation circuit 15, feeding of the predetermined gate voltage to the Nch transistors 11 and 12 so as to turn them on. When the PWM output of the PWM comparator 17 becomes a low level, the drive circuit 13 stops feeding of the predetermined gate voltage to the Nch transistors 11 and 12 so as to turn them off.

When the above-described on/off control of the Nch transistors 11 and 12, namely, switching control operation of the drive circuit 13 is in the activated state, the stepping-up operation is activated so as to make the feedback voltage Vfb and the reference voltage Vref equal. As a result, the output current Iout is stabilized to a current value obtained by dividing the reference voltage Vref (=feedback voltage Vfb) by the resistance value of the output current detection resistance R1.

The signals inputted to the inverting input terminal of the PWM comparator 17 include a signal according to the current flowing through the resistance R2, i.e., a signal according to the current flowing through the coil 3 when the Nch transistors 11 and 12 are turned on. This makes it possible to control the peak current of the coil 3. Moreover, upon detecting the output voltage Vout exceeding a predetermined voltage, the overvoltage detection circuit 23 makes the drive circuit 13 deactivate the switching control operation. This makes it possible to prevent the overvoltage exceeding the predetermined voltage from being applied to the white light-emitting diodes LED1 to LED6, which are loads, and the output capacitor 5. Furthermore, upon detecting overheating, especially around the Nch transistor 12, resulting from the switching control operation of the drive circuit 13, the overheating detection circuit 22 makes the drive circuit 13 deactivate the switching control operation. This makes it possible to prevent a breakdown or the like of the stepping-up chopper regulator 10 due to overheating.

The on/off circuit 21 makes the drive circuit 13 activates/deactivates the switching control operation according to the brightness adjusting signal inputted to the control terminal $T_{CTRL}$. When the drive circuit 13 activates the switching control operation, the switching power supply circuit activates the stepping-up operation; when the drive circuit 13 deactivates the switching control operation, the switching power supply circuit deactivates the stepping-up operation. Used as the brightness adjusting signal is, for example, a PWM (pulse width modulation) signal. When the brightness adjusting signal inputted to the control terminal $T_{CTRL}$ takes a high level, the on/off circuit 21 makes the drive circuit 13 activate the switching control operation, and thus makes the output current Iout flow through the white light-emitting diodes LED1 to LED6. On the other hand, when the brightness adjusting signal takes a low level, the on/off circuit 21 makes the drive circuit 13 deactivate the switching control operation, and thus lowers the output voltage Vout. This makes the average current flowing through the white light-emitting diodes LED1 to LED6 vary according to the duty of the brightness adjusting signal. The brightness of the white light-emitting diodes LED1 to LED6 is proportional to the average current flowing therethrough. This makes it possible to adjust the brightness of the white light-emitting diodes LED1 to LED6 by changing the duty of the brightness adjusting signal.

When the drive circuit 13 starts the switching control operation, the soft-start circuit 20 gradually changes the output duty of the drive circuit 13, and thereby makes the output voltage Vout rise gently. In other words, the soft-start circuit is a circuit that performs so-called soft-start operation. If the output voltage Vout does not rise gently, when the capacitor 5 is uncharged, an excessive charge current flows from the direct-current source 1 to charge it. The problem here is that when the direct-current source 1 is a battery such as a lithium-ion battery, such an excessive charge current puts an extra strain on the battery. Furthermore, this excessive charge current lowers the battery voltage, and thus makes it impossible to use the battery to its end voltage.

As shown in FIG. 11B, the soft-start circuit 20 consists of terminals T1 to T3, switches SW1 and SW2, a constant current source I1, a capacitance C1, and a P-channel MOSFET Q1 (hereinafter referred to as a Pch transistor). The terminal T1 is connected to the control terminals of the switches SW1 and SW2, and the terminal T2 is connected, via the switch SW1 and the constant current source I1, to the gate of the Pch transistor Q1, to one end of the capacitance C1, and to one end of the switch SW2. The other end of the capacitance C1, the other end of the switch SW2, and the drain of the Pch transistor Q1 are connected to the ground, and the source of the Pch transistor Q1 is connected to the terminal T3. Note that the terminal T1 is connected to the control terminal $T_{CTRL}$, the terminal T2 is connected to the power supply terminal $T_{VIN}$ via the switch 25, and the terminal T3 is connected to the node at which the non-inverting input terminal of the PWM comparator 17 and the output terminal of the error amplifier 18 are connected together. The switch SW1 is turned on when a high level signal is fed to its control terminal, and is turned off when a low level signal is fed thereto. The switch SW2 is turned off when a high level signal is fed to its control terminal, and is turned on when a low level signal is fed thereto.

In the switching power supply circuit shown in FIG. 11A, every time a brightness adjusting signal $V_{CTRL}$ inputted to the control terminal $T_{CTRL}$ turns from a low level to a high level, the soft-start circuit 20 performs soft-start operation so as to cause the output voltage Vout to rise gently. This prevents the output voltage Vout from rising quickly to a predetermined voltage value V1. The problem here is that when the brightness adjusting signal $V_{CTRL}$ has a short cycle and thus remains at a high level only for a short period of time, it is impossible to apply to the white light-emitting diodes LED1 to LED6 a voltage required by them to emit light. This makes it impossible to perform desired brightness adjustment according to the duty of the brightness adjusting signal.

In view of the conventionally experienced inconveniences and disadvantages described above, the inventors of the present invention have devised a switching power supply circuit that activates/deactivates stepping-up operation according to an external signal and that can make the output voltage reach a target value even when a cycle with which the stepping-up operation is switched between an activated state and a deactivated state is short. Such a switching power supply circuit has been proposed, in the Japanese Patent Application filed as No. 2004-65427, by the applicant of the present invention.

The switching power supply circuit proposed in the above Patent Application differs from the switching power supply circuit shown in FIG. 11A only in that the soft-start circuit 20 is replaced with a soft-start circuit shown in FIG. 12 or a soft-start circuit shown in FIG. 13. Note that, in FIGS. 12 and 13, such members as are found also in FIG. 11B will be identified with common reference characters.

The soft-start circuit shown in FIG. 12 consists of terminals T1 to T3, a switch SW1, a constant current source I1, a capacitance C1, a Pch transistor Q1, a switch SW2, and a constant current source I2. The terminal T1 is connected to the control terminals of the switches SW1 and SW2, and the terminal T2 is connected, via the switch SW1 and the constant current source I1, to the gate of the Pch transistor Q1, to one end of the capacitance C1, and to one end of the switch SW2. The other end of the capacitance C1 and the drain of the Pch transistor Q1 are connected to the ground, the source of the Pch transistor Q1 is connected to the terminal T3, and the other end of the switch SW2 is connected to the ground via the constant current source I2. Note that the terminal T1 is connected to the control terminal $T_{CTRL}$, the terminal T2 is connected to the power supply terminal $T_{VIN}$, and the terminal T3 is connected to the node at which the non-inverting input terminal of the PWM comparator 17 and the output terminal of the error amplifier 18 are connected together. The switch SW1 is turned on when a high level signal is fed to its control terminal, and is turned off when a low level signal is fed thereto. The switch SW2 is turned off when a high level signal is fed to its control terminal, and is turned on when a low level signal is fed thereto.

When the input voltage Vin is fed to the terminal T2 and the brightness adjusting signal fed to the terminal T1 takes a high level, the switch SW1 is turned on and the switch SW2 is turned off. This makes the constant current source I1 output a constant current, and thereby charging of the capacitance C1 is started. After charging of the capacitance C1 is started, the gate potential of the Pch transistor Q1 gradually changes from a low potential to a high potential until the Pch transistor Q1 is switched from on to off. The gate potential $\Delta V1$ of the Pch transistor Q1 is expressed by formula (1) below. It is to be noted that $C_1$ represents the capacitance value of the capacitance C1, $I_1$ represents the output current value of the constant current source I1, and $\Delta t1$ represents the charging time.

$$\Delta V1 = I_1 \cdot \Delta t1 / C_1 \quad (1)$$

As the gate potential of the Pch transistor Q1 changes from a low potential to a high potential, the output potential of the error amplifier 18 gradually increases. This realizes soft-start operation. The rising speed of the output voltage Vout with soft-start operation can be easily set by adjusting the capacitance value $C_1$ of the capacitance C1 and the output current value $I_1$ of the constant current source I1.

On the other hand, when the brightness adjusting signal fed to the terminal T1 turns to a low level, the switch SW1 is turned off and the switch SW2 is turned on. This makes the constant current source I2 extract the charges accumulated in the capacitance C1. The charge extraction described above causes a potential drop $\Delta V2$ across the gate of the Pch transistor Q1, which is expressed by formula (2) below. It is to be noted that $C_1$ represents the capacitance value of the capacitance C1, $I_2$ represents the output current value of the constant current source I2, and $\Delta t2$ represents the charge extraction time.

$$\Delta V2 = I_2 \cdot \Delta t2 / C_1 \quad (2)$$

By reducing the potential drop $\Delta V2$, it is possible to suppress extraction of the charges accumulated in the capacitance C1. Thus, it is necessary to make the ratio $I_1/I_2$ greater to suppress extraction of the charges accumulated in the capacitance C1. This makes it possible to suppress reduction in the output potential of the error amplifier 18.

When reduction in the output potential of the error amplifier 18 is suppressed, the soft-start circuit shown in FIG. 12 cannot perform soft-start operation. This allows the output voltage Vout to reach the target value (=V1) even when the brightness adjusting signal $V_{CTRL}$ remains at a high level only for a short period of time, as seen in FIG. 14 showing the waveforms of the brightness adjusting signal $V_{CTRL}$ fed from the outside of the stepping-up switching power supply device provided with the soft-start circuit shown FIG. 12 or FIG. 13, of the output voltage Vout, and of the input current Iin fed from the direct-current source 1. This makes it possible to make the LED1 to LED6 emit light. This makes it possible, even when the brightness adjusting signal has a short cycle and thus remains at a high level only for a short period of time, to perform a desired brightness adjustment according to the duty of the brightness adjusting signal. Note that the ratio $I_1/I_2$ described above is so set that the period required to complete discharging of the capacitance is made longer than a cycle with which the on/off circuit 21 switches the switching control operation of the drive circuit 13 between the activated state and the deactivated state.

In FIG. 14, assuming that the switching power supply circuit is started up at the time point when the brightness adjusting signal $V_{CTRL}$ turns from a low level to a high level for the first time, and, when the switching power supply circuit is started up, the output voltage Vout is 0 (V), and the output capacitor 5 is not charged at all.

When a brightness adjusting signal that turns to a low level when the power source switch provided between the direct-current source 1 and the switching power supply circuit is off, i.e. when the input voltage Vin is not fed to the switching power supply circuit is inputted to the stepping-up switching power supply circuit provided with the soft-start circuit shown in FIG. 12, the charges accumulated in the capacitance C1 are extracted by the constant current source I2 when the power source switch is off, i.e. when the input voltage Vin is not fed to the switching power supply circuit. In that case, the time when the power source switch is off, i.e. the charge extraction time $\Delta t2$ is long enough to allow the constant current source I2 to extract a sufficient amount of charges from the capacitance C1. This makes the gate potential of the Pch transistor Q1 equal to or nearly equal to the ground potential. This permits the soft-start circuit shown in FIG. 12 to perform soft-start operation when the power source switch is switched from off to on.

The soft-start circuit shown in FIG. 13 consists of terminals T1 to T3, a switch SW1, a constant current source I3, a capacitance C1, a Pch transistor Q1, and a constant current source I4. The terminal T1 is connected to the control terminal of the switch SW1, and the terminal T2 is connected, via the switch SW1 and the constant current source I3, to the gate of the Pch transistor Q1, to one end of the capacitance C1, and to one end of the constant current source I4. The other end of the capacitance C1, the drain of the Pch transistor Q1, and the other end of the constant current source I4 are connected to the ground, and the source of the Pch transistor Q1 is connected to the terminal T3. Note that the terminal T1 is connected to the control terminal $T_{CTRL}$, the terminal T2 is connected to the power supply terminal $T_{VIN}$, and the terminal T3 is connected to the node at which the non-inverting input terminal of the PWM comparator 17 and the output terminal of the error amplifier 18 are connected together. The switch SW1 is turned on when a high level signal is fed to its control terminal, and is turned off when a low level signal is fed thereto.

When the input voltage Vin is fed to the terminal T2 and the brightness adjusting signal fed to the terminal T1 takes a high level, the switch SW1 is turned on. This makes the constant current source I3 output a constant current. Of this constant current, a part is extracted by the constant current source I4, and the rest serves as a charge current for the capacitance C1. As the capacitance C1 is charged, the gate potential of the Pch transistor Q1 gradually increases from a low potential to a high potential until the Pch transistor Q1 is switched from on to off. The gate potential $\Delta V1$ of the Pch transistor Q1 is expressed by formula (3) below. It is to be noted that $C_1$ represents the capacitance value of the capacitance C1, $I_3$ represents the output current value of the constant current source I3, $I_4$ represents the output current value of the constant current source I4, and $\Delta t1$ represents the charging time.

$$\Delta V1 = (I_3 - I_4) \cdot \Delta t1 / C_1 \quad (3)$$

As the gate potential of the Pch transistor Q1 changes from a low potential to a high potential, the output potential of the error amplifier 18 gradually increases. This realizes soft-start operation. The rising speed of the output voltage Vout with soft-start operation can be easily set by adjusting the capacitance value $C_1$ of the capacitance C1, the output current value $I_3$ of the constant current source I3, and the output current value $I_4$ of the constant current source I4. In the soft-start circuit shown in FIG. 12, when the gate potential of the Pch transistor Q1 is equal to or smaller than a predetermined value, there is no choice but to use a leakage current to extract the charges accumulated in the capacitance C1 due to the resistance of the switch SW2. On the other hand, in the soft-start circuit shown in FIG. 13, it is possible to reliably extract the charges accumulated in the capacitance C1 by using the output current of the constant current source I4.

On the other hand, when the brightness adjusting signal fed to the terminal T1 turns to a low level, the switch SW1 is turned to off. This makes the constant current source I4 extract the charges accumulated in the capacitance C1. The charge extraction described above causes a potential drop $\Delta V2$ across the gate of the Pch transistor Q1, which is expressed by formula (4) below. It is to be noted that $C_1$ represents the capacitance value of the capacitance C1, $I_4$ represents the output current value of the constant current source I4, and $\Delta t2$ represents the charge extraction time.

$$\Delta V2 = I_4 \cdot \Delta t2 / C_1 \quad (4)$$

By reducing the potential drop $\Delta V2$, it is possible to suppress extraction of the charges accumulated in the capacitance C1. Thus, it is necessary to make the ratio $I_3/I_4$ greater to suppress extraction of the charges accumulated in the capacitance C1. This makes it possible to suppress reduction in the output potential of the error amplifier 18. Here, as far as charging of the capacitance C1 is concerned, the current extracted by the constant current source I4 is wasted. Thus, the ratio $I_3/I_4$ is preferably made greater than the ratio $I_1/I_2$ by making the output current value $I_4$ of the constant current source I4 smaller.

When reduction in the output potential of the error amplifier 18 is suppressed, the soft-start circuit shown in FIG. 13 cannot perform soft-start operation. This allows the output voltage Vout to reach the target value (=V1) even when the brightness adjusting signal $V_{CTRL}$ remains at a high level only for a short period of time, as seen in FIG. 14 showing the waveforms of the brightness adjusting signal $V_{CTRL}$ fed from the outside of the stepping-up switching power supply device provided with the soft-start circuit shown FIG. 12 or FIG. 13, of the output voltage Vout, and of the input current Iin fed from the direct-current source 1. This makes it possible to make the LED1 to LED6 emit light. This makes it possible, even when the brightness adjusting signal has a short cycle and thus remains at a high level only for a short period of time, to perform a desired brightness adjustment according to the duty of the brightness adjusting signal. Note that the ratio $I_3/I_4$ described above is so set that the period required to complete discharging of the capacitance is made longer than a cycle with which the on/off circuit 21 switches the switching control operation of the drive circuit 13 between the activated state and the deactivated state.

When the power source switch provided between the direct-current source 1 and the switching power supply circuit is off, i.e. when the input voltage Vin is not fed to the switching power supply circuit, the charges accumulated in the capacitance C1 are extracted by the constant current source I4. In that case, the time when the power source switch is off, i.e. the charge extraction time Δt2 is long enough to allow the constant current source I4 to extract a sufficient amount of charges from the capacitance C1. This makes the gate potential of the Pch transistor Q1 equal to or nearly equal to the ground potential. This permits the soft-start circuit shown in FIG. 13 to perform soft-start operation when the power source switch is switched from off to on.

In order to produce ICs at lower cost, it is necessary to provide a single terminal with a plurality of capabilities and use a package with a small number of pins. Thus, in the stepping-up chopper regulator provided with the soft-start circuit shown in FIG. 12 or FIG. 13, the control terminal $T_{CTRL}$ is given capabilities of reducing the power consumption to nearly zero when the switching power supply circuit is off, of performing soft-start operation when the switching power supply circuit is switched from off to on, and of stopping soft-start operation when the brightness of the white LED is adjusted according to the duty of the brightness adjusting signal. However, power supply to all the circuits is stopped when the switching power supply circuit is off, because the power consumption is reduced to nearly zero when the switching power supply circuit is off. Therefore, it takes some time to start all the circuit portions after the switching power supply circuit is turned on. This is especially disadvantage because the feedback system does not operate properly until the circuit portion that serves as a power source for various amplifiers is started up.

When the constant voltage circuit 24 that converts the input voltage Vin fed from the direct-current source 1 into a predetermined voltage Vc has a configuration shown in FIG. 15, the constant voltage circuit 24 is not started up until a parasitic capacitance PC is fully charged. In a case where the Nch transistor 12 is turned on when the constant voltage circuit 24 is not started up, the Nch transistor 12 is kept turned on until the constant voltage circuit 24 is started up because the amplifiers (the PWM comparator 17, the error amplifier 18, and the like) are not controlled.

This does not cause any problem for the switching power supply circuit shown in FIG. 11A, because soft-start operation is performed when the switching power supply circuit is turned on. However, in the switching power supply circuit provided with the soft-start circuit shown in FIG. 12 or FIG. 13, when the Nch transistor 12 is kept turned on until the constant voltage circuit 24 is started up, a flow-through current flows through the Nch transistor 12 (see FIG. 16). In FIG. 16, $V_{CTRL}$ represents the brightness adjusting signal fed from the outside to the switching power supply circuit provided with the soft-start circuit shown in FIG. 12 or FIG. 13, Vout represents the output voltage of the switching power supply circuit provided with the soft-start circuit shown in FIG. 12 or FIG. 13, $I_{SW}$ represents the drain current of the Nch transistor 12 of the switching power supply circuit provided with the soft-start circuit shown in FIG. 12 or FIG. 13, and PI represents the flow-through current flowing through the Nch transistor 12 of the switching power supply circuit provided with the soft-start circuit shown in FIG. 12 or FIG. 13.

As described above, in the switching power supply circuit provided with the soft-start circuit shown in FIG. 12 or FIG. 13, when the brightness of the white LED is adjusted according to the duty of the brightness adjusting signal, excessive current flows through the Nch transistor 12 every time the switching power supply circuit is turned on. This makes the battery reach its end voltage (about 3.0V) earlier than expected. This disadvantageously restricts the length of the battery time with one charge.

SUMMARY OF THE INVENTION

It is an object of the present invention to provide a switching power supply circuit that activates/deactivates stepping-up operation according to an external signal and that can make the output voltage reach a target value even when a cycle with which the stepping-up operation is switched between an activated state and a deactivated state is short, while preventing a flow-through current from flowing through a switching device when the stepping-up operation is switched from a deactivated state to an activated state, and an electronic apparatus provided therewith.

To achieve the above object, according to the present invention, a switching power supply circuit is provided with a stepping-up DC-DC converter, a comparing portion, a driving portion, a constant voltage portion, a switching portion, an activating/deactivating portion, and a soft-start circuit. The comparing portion compares a reference voltage with a voltage based on the output current of the stepping-up DC-DC converter. The driving portion performs switching control to turn on/off a switching device provided in the stepping-up DC-DC converter according to the output of the comparing portion. The constant voltage portion feeds a constant voltage as a drive voltage at least to the comparing portion. The switching portion switches constant voltage feeding operation of the constant voltage portion between an activated state and a deactivated state according to an external signal. The activating/deactivating portion switches switching control operation of the driving portion between an activated state and a deactivated state according to the external signal, while preventing the switching control operation of the driving portion from being switched from the deactivated state to the activated state from a time point that the constant voltage feeding operation of the constant voltage portion is switched from the deactivated state to the activated state until a predetermined period elapses. The soft start circuit has a capacitance and a discharging portion, charges the capacitance when the switching control operation of the driving portion is started and thus an output voltage of the stepping-up DC-DC converter rises, controls the driving portion according to a voltage across the capacitance in such a way that, when the output voltage of the stepping-up DC-DC converter rises, the output voltage of the stepping-up DC-DC converter rises gently regardless of the output of the comparing portion, and makes the discharging portion discharge the capacitance when the switching control operation of the driving portion is in the deactivated state, completion of discharging of the capacitance requiring a period longer than a cycle with which the activating/deactivating portion switches the switching control operation of the driving portion between the activated state and the deactivated state.

With this configuration, the period required to complete discharging of the capacitance is made longer than a cycle with which the activating/deactivating portion switches the switching control operation of the driving portion between the activated state and the deactivated state, and the soft-start circuit is prevented from performing soft-start operation until discharging of the capacitance is completed. This makes it possible to make the output voltage of the stepping-up DC-DC converter reach a target value even when a cycle with which the activating/deactivating portion switches the switching control operation of the driving portion between the activated state and the deactivated state is short. Thus, it is possible to make the output voltage reach a target value even when a cycle with which stepping-up operation is switched between an activated state and a deactivated state is short. Furthermore, the activating/deactivating portion prevents the switching control operation of the driving portion from being switched from the deactivated state to the activated state from a time point that the constant voltage feeding operation of the constant voltage portion is switched from the deactivated state to the activated state until a predetermined period elapses. Thus, by making the predetermined period longer than the start up time of the constant voltage portion, the switching device is turned and kept off until the constant voltage portion is started up. This prevents a flow-through current from flowing through the switching device.

Moreover, an electronic apparatus according to the present invention is provided with a switching power supply circuit configured as described above. The switching power supply circuit feeds electric power, for example, to an illumination light source of a liquid crystal display device incorporated in the electronic apparatus.

DETAILED DESCRIPTION OF PREFERRED EMBODIMENTS

Figure 1:
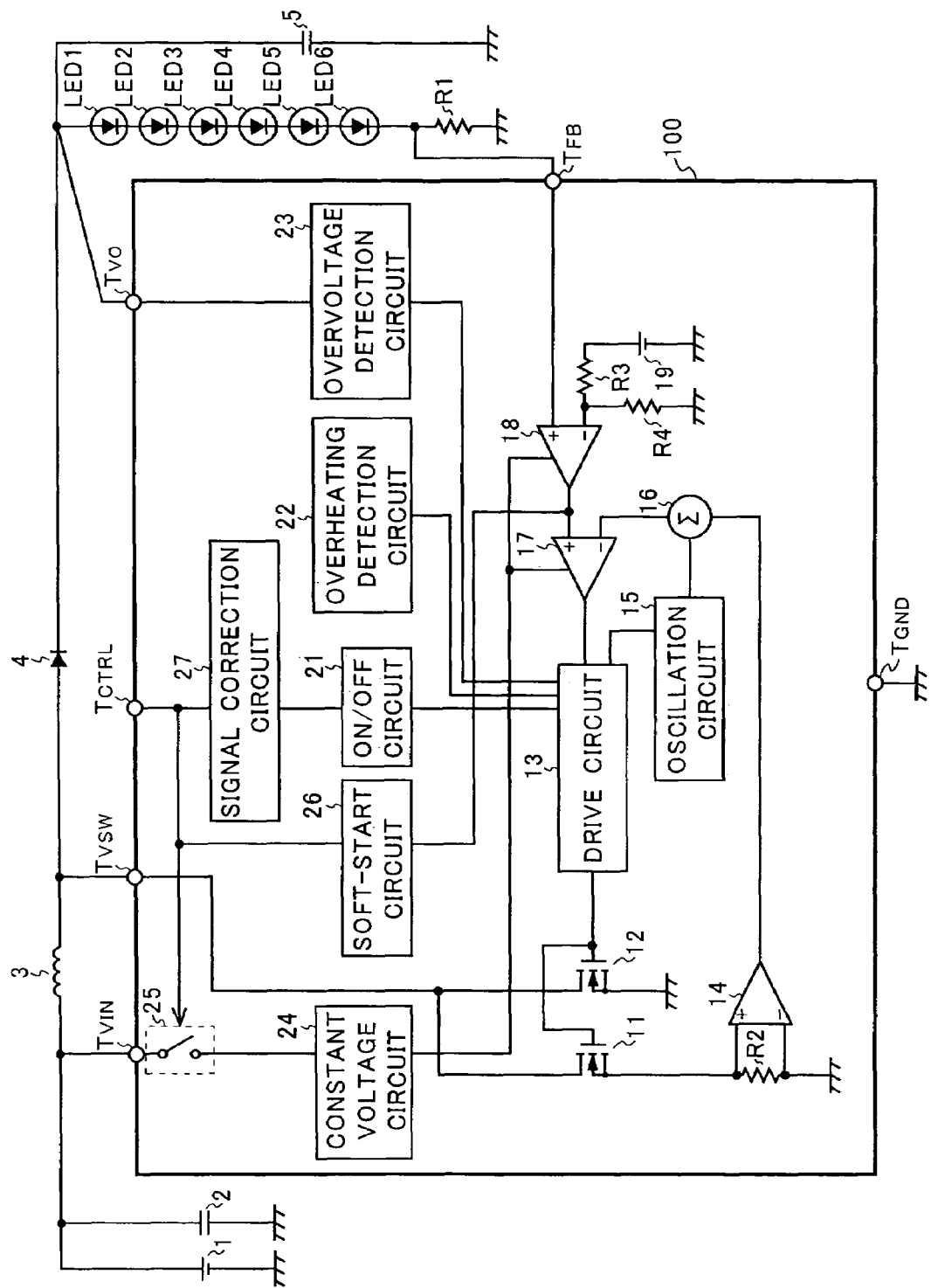
FIG. 1 is a diagram showing an example of the configuration of a stepping-up switching power supply circuit embodying the invention.

An example of the configuration of a switching power supply circuit embodying the invention is shown in FIG. 1. Note that, in FIG. 1, such members as are found also in FIG. 11A are identified with common reference numerals, and their detailed descriptions will be omitted.

Figure 11A:
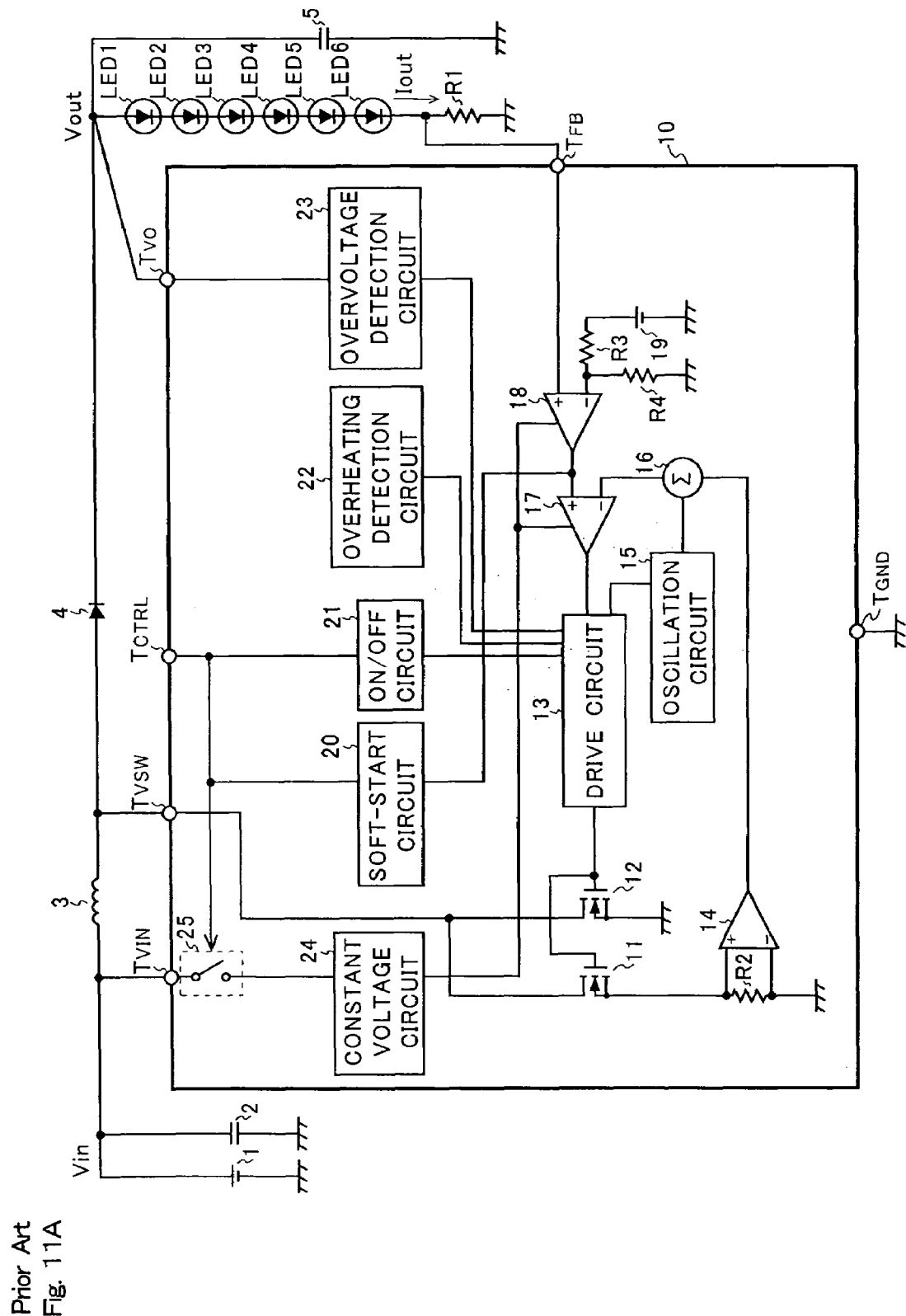
FIGS. 11A and 11B are diagrams showing an example of the configuration of a conventional stepping-up switching power supply circuit.
Figure 11B:
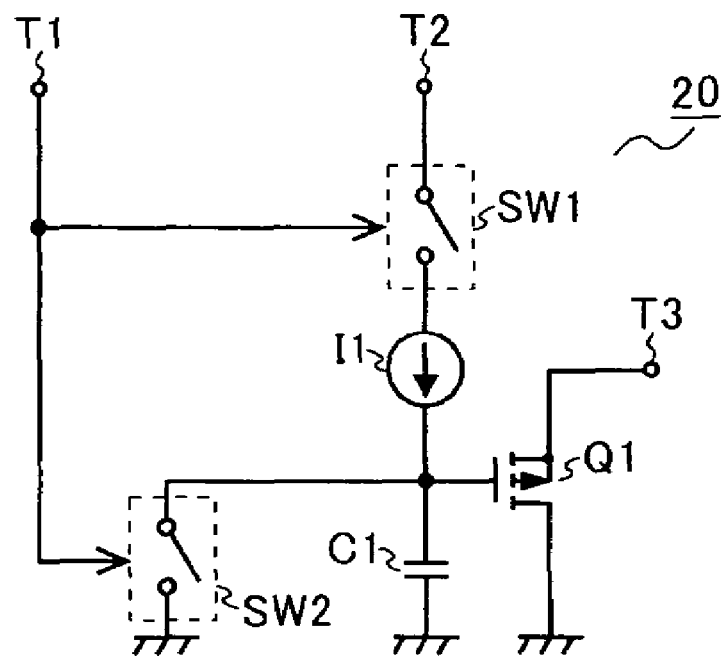

The switching power supply circuit shown in FIG. 1 embodying the invention has a configuration in which the stepping-up chopper regulator 10 of the conventional switching power supply circuit shown in FIG. 11A is replaced with a stepping-up chopper regulator 100. The stepping-up chopper regulator 100 differs from the stepping-up chopper regulator 10 in that the soft-start circuit 20 of the stepping-up chopper regulator 10 is replaced with a soft-start circuit 26, and a signal correction circuit 27 that receives a brightness adjusting signal from the control terminal $T_{CTRL}$ and feeds to the on/off circuit 21 a corrected signal obtained by correcting the received brightness adjusting signal is additionally provided.

The signal correction circuit 27 feeds to the on/off circuit 21 a corrected signal that is the same as the brightness adjusting signal except that it takes a low level from a time point that the brightness adjusting signal turns from a low level to a high level until a predetermined period t1 elapses.

Figure 12:
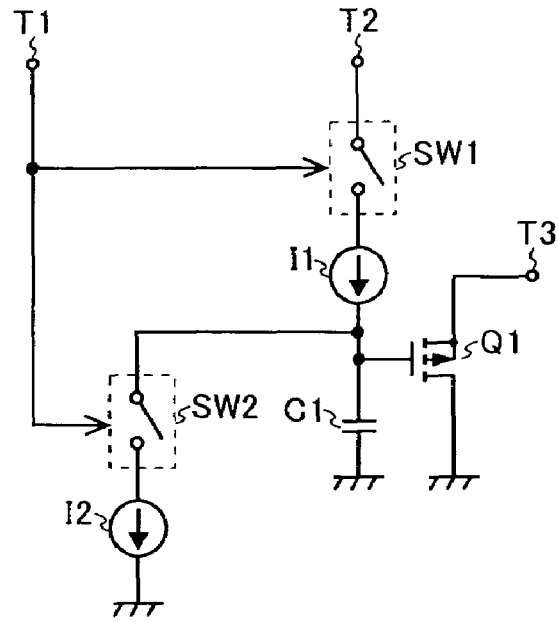
FIG. 12 is a diagram showing an example of the configuration of a soft-start circuit.
Figure 13:
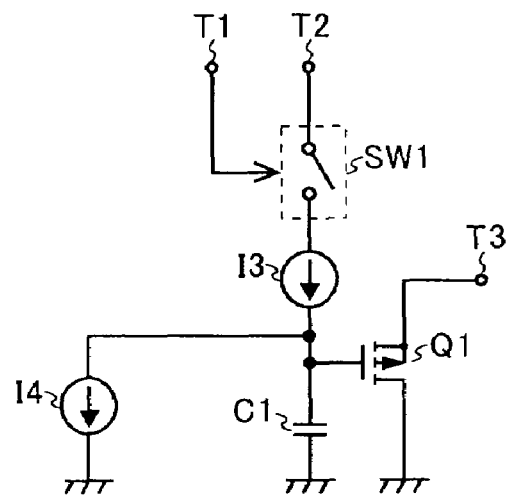
FIG. 13 is a diagram showing another example of the configuration of the soft-start circuit.
Figure 14:
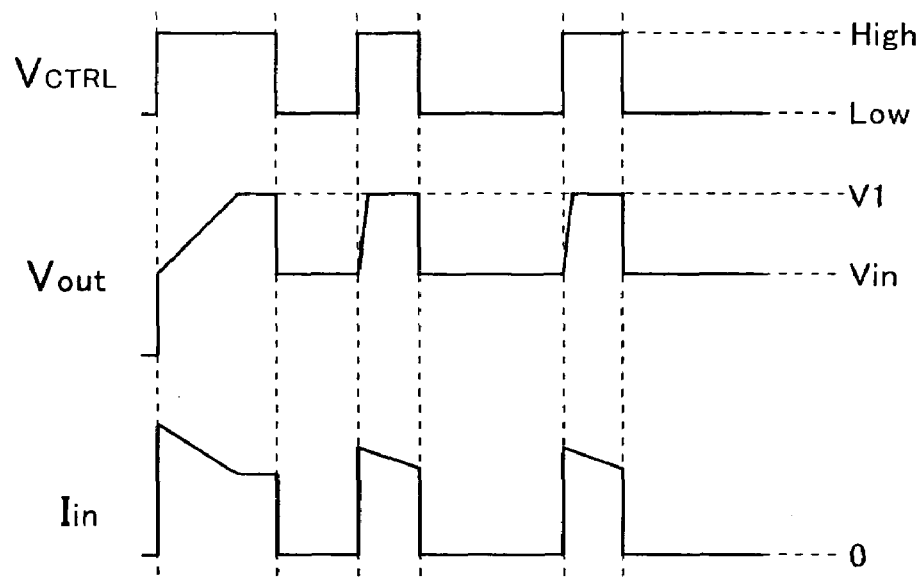
FIG. 14 is a time chart showing the voltage and current waveforms appearing at various parts of the stepping-up switching power supply circuit in which the soft-start circuit of the stepping-up switching power supply circuit shown in FIG. 11 is replaced with the soft-start circuit shown in FIG. 12 or FIG. 13.

The soft-start circuit 26 is a soft-start circuit having the configuration shown in FIG. 12 or FIG. 13. With this configuration, even when the brightness adjusting signal has a short cycle and thus remains at a high level only for a short period of time, it is possible to perform a desired brightness adjustment according to the duty of the brightness adjusting signal.

Figure 2:
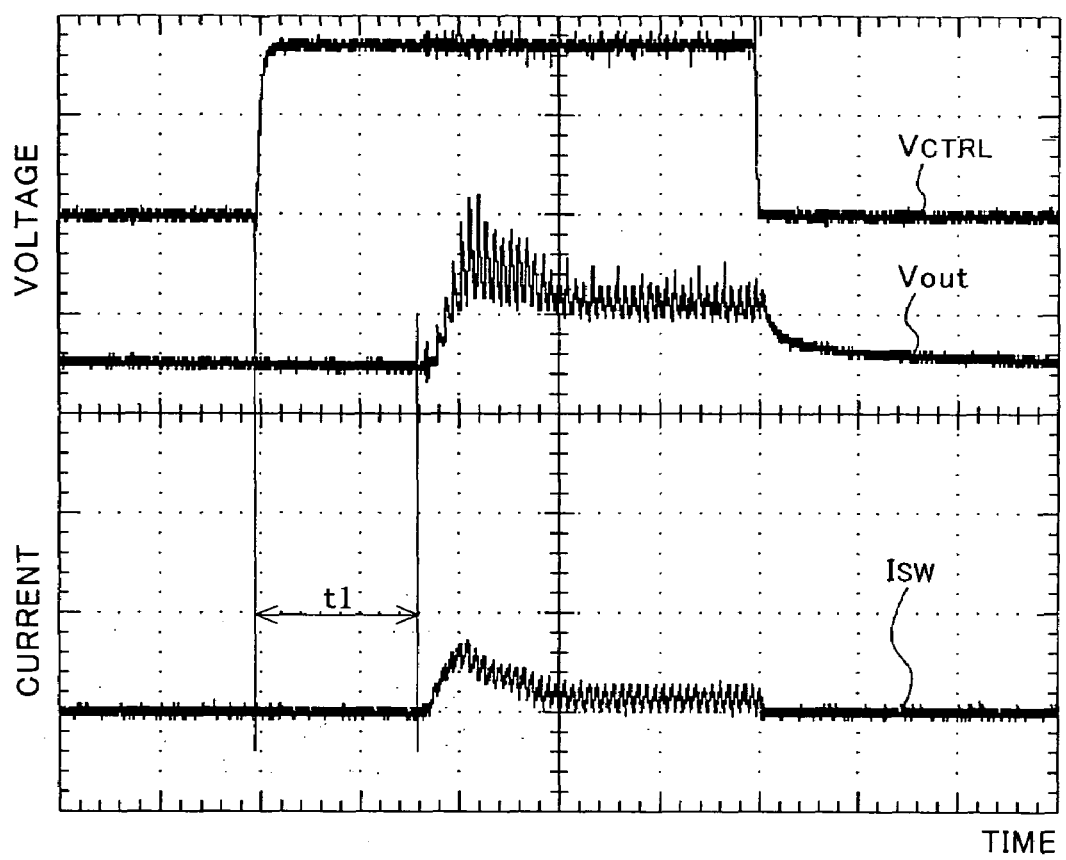
FIG. 2 is a time chart showing the voltage and current waveforms appearing at various parts of the stepping-up switching power supply circuit shown in FIG. 1.
Figure 15:
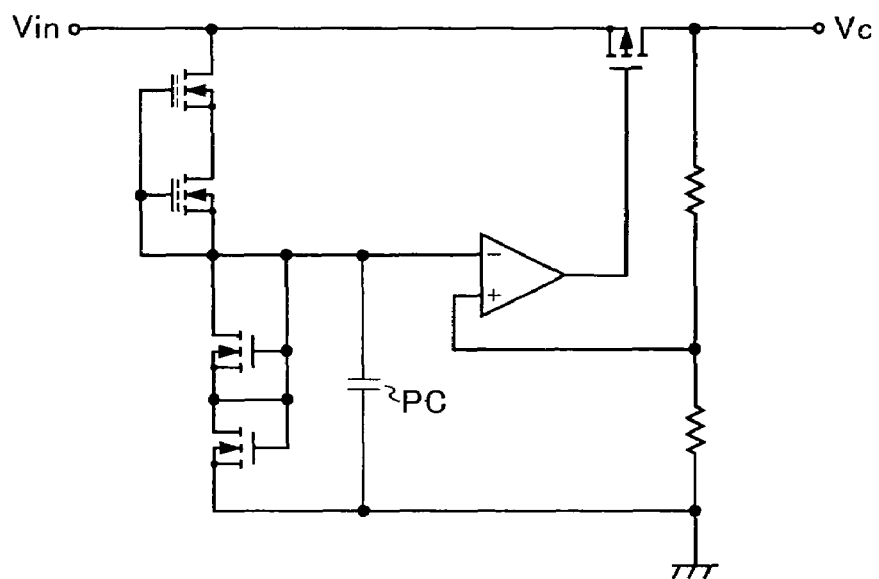
FIG. 15 is a diagram showing an example of the configuration of a constant voltage circuit.
Figure 16:
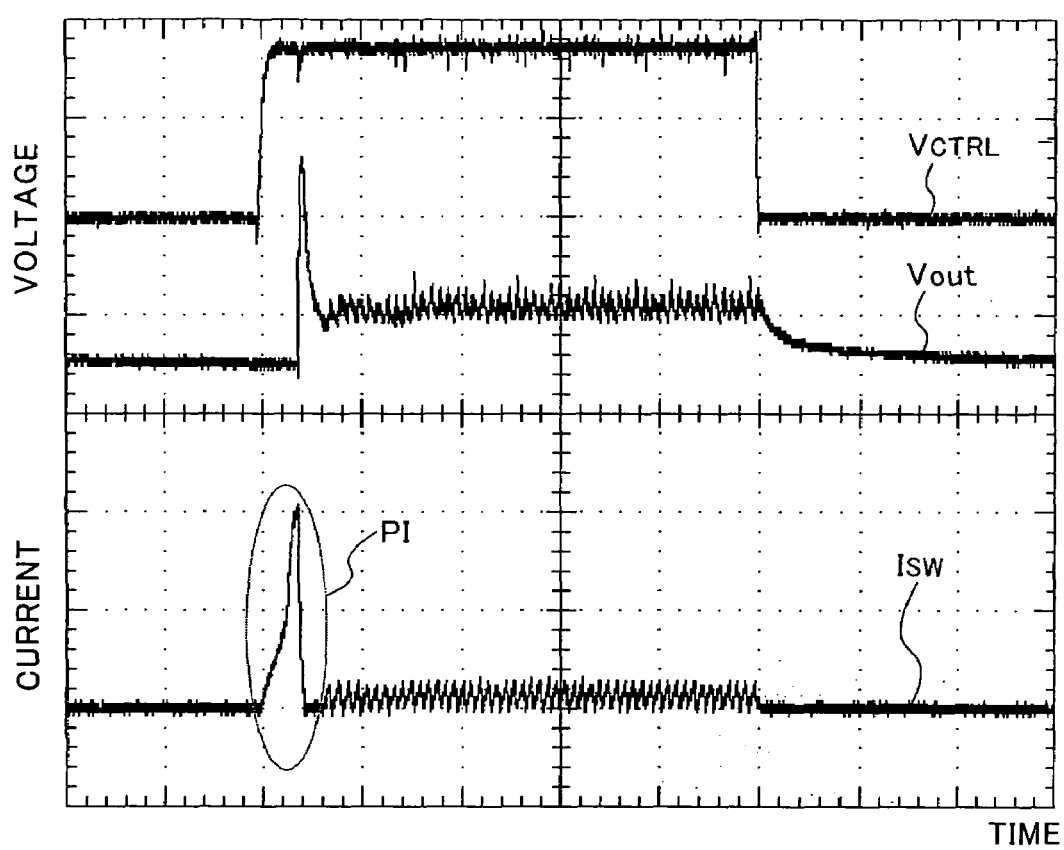
FIG. 16 is a time chart showing the voltage and current waveforms appearing at various parts of the stepping-up switching power supply circuit in which the soft-start circuit of the stepping-up switching power supply circuit shown in FIG. 11 is replaced with the soft-start circuit shown in FIG. 12 or FIG. 13.

When the constant voltage circuit 24 has a configuration shown in FIG. 15, the constant voltage circuit 24 is not started up until a parasitic capacitance PC is fully charged. However, the signal correction circuit 27 feeds to the on/off circuit 21 a corrected signal that is the same as the brightness adjusting signal except that it takes a low level from a time point that the brightness adjusting signal turns from a low level to a high level until a predetermined period t1 elapses. Thus, by making the predetermined period t1 longer than the start up time of the constant voltage circuit 24, the Nch transistor 12 is turned and kept off until the constant voltage circuit 24 is started up. This prevents the flow-through current from flowing through the Nch transistor 12 (see FIG. 2). Note that, in FIG. 2, $V_{CTRL}$ represents the brightness adjusting signal fed from the outside to the switching power supply circuit shown in FIG. 1, Vout represents the output voltage of the switching power supply circuit shown in FIG. 1, and $I_{SW}$ represents the drain current of the Nch transistor 12 of the switching power supply circuit shown in FIG. 1.

Figure 3:
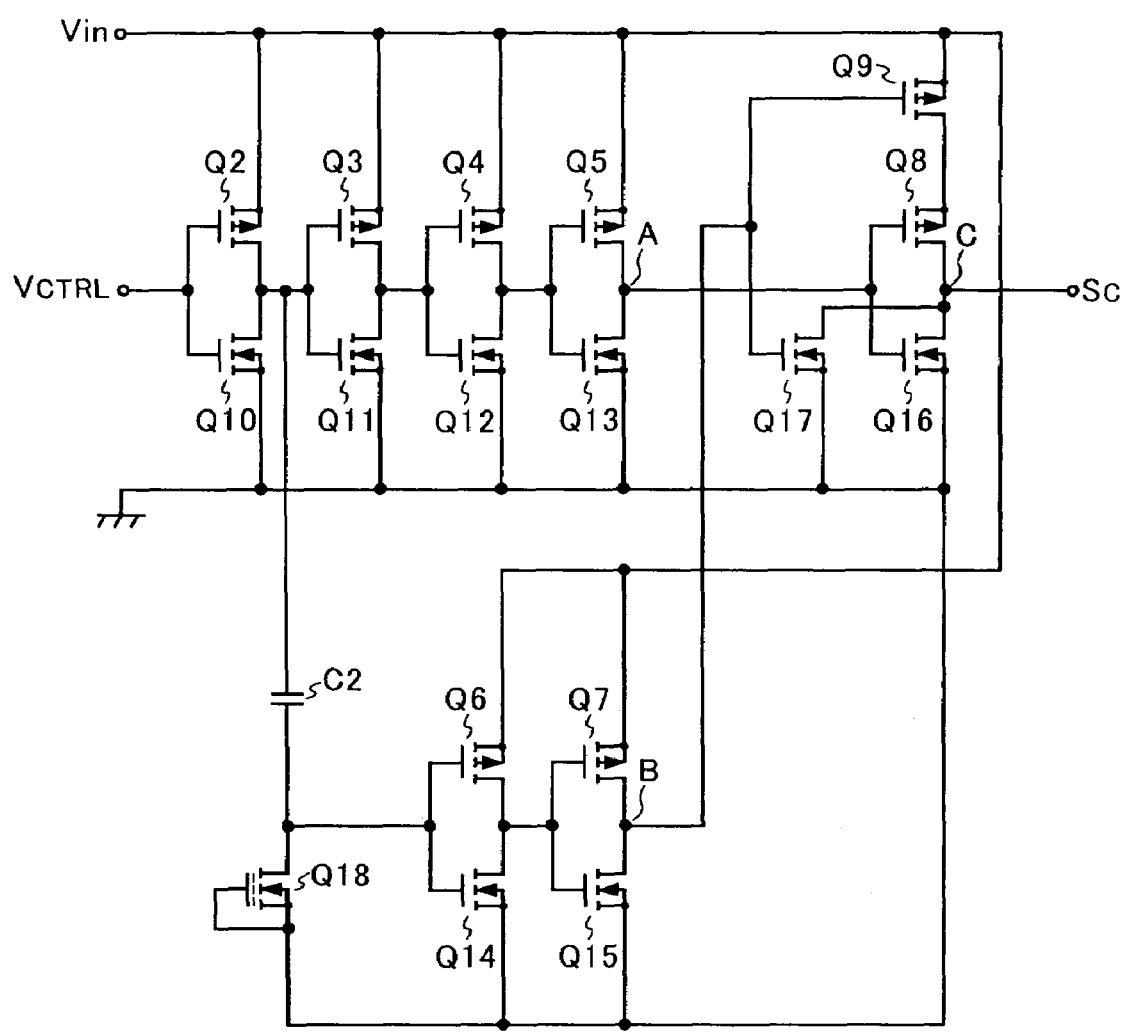
FIG. 3 is a diagram showing an example of the configuration of a signal correction circuit provided in the stepping-up switching power supply circuit shown in FIG. 1.

Here, an example of the configuration of the signal correction circuit 27 is shown in FIG. 3. The signal correction circuit shown in FIG. 3 is provided with Pch transistors Q2 to Q9, Nch transistors Q10 to Q17, an N-channel depression transistor Q18, and a capacitor C2.

Figure 4:
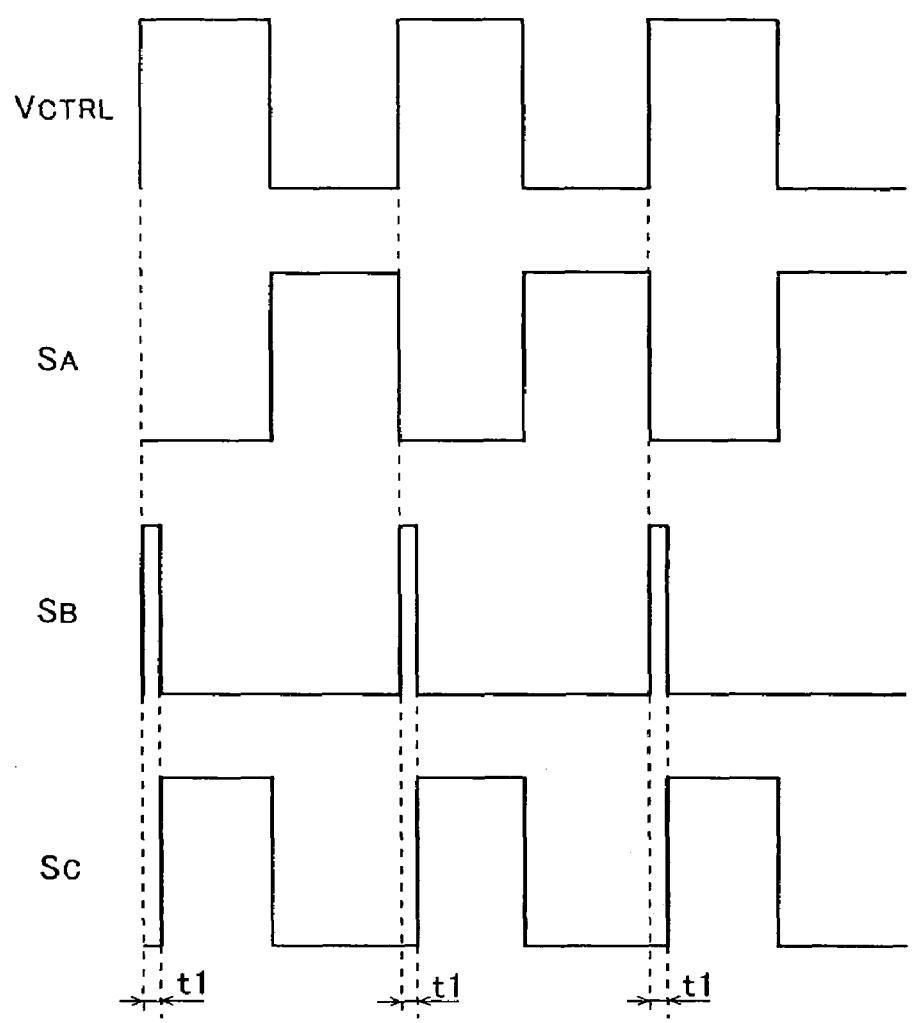
FIG. 4 is a time chart showing the signal waveforms appearing at various parts of the signal correction circuit shown in FIG. 3.

The Pch transistors Q2 to Q5 and the Nch transistors Q10 to Q13 constitute a first signal generation portion. The first signal generation portion outputs a signal $S_A$ (see FIG. 4) that is an inverted signal of the brightness adjusting signal $V_{CTRL}$ to the node A at which the drain of the Pch transistor Q5 and the drain of the Nch transistor Q13 are connected together.

The Pch transistors Q2, Q6, and Q7, the Nch transistors Q10, Q14, and Q15, the N-channel depression transistor Q18, and the capacitor C2 constitute a second signal generation portion. The second signal generation portion outputs, to the node B at which the drain of the Pch transistor Q7 and the drain of the Nch transistor Q15 are connected together, a signal $S_B$ (see FIG. 4) that takes a high level from a time point that the brightness adjusting signal $V_{CTRL}$ turns from a low level to a high level until a predetermined period t1 elapses and that otherwise takes a low level.

The Pch transistors Q8 and Q9 and the Nch transistors Q16 and Q17 constitute a third signal generation portion. The third signal generation portion outputs, to the node C at which the drain of the Pch transistor Q8, the drain of the Nch transistor Q16, and the drain of the Nch transistor Q17 are connected together, a signal $S_C$ (see FIG. 4) that takes a low level when one of the signal $S_A$ and the signal $S_B$ takes a low level and the other takes a high level, and that takes a high level when both of the signal $S_A$ and the signal $S_B$ are at a low level. The signal $S_C$ outputted from the third signal generation portion serves as the output signal of the signal correction circuit shown in FIG. 3.

The signal correction circuit shown in FIG. 3 has a simple circuit configuration because it determines the predetermined period t1 by using the time constants of the N-channel depression transistor Q18 and the capacitor C2. This makes it possible to achieve cost reduction.

However, a signal correction circuit, like the signal correction circuit shown in FIG. 3, that determines the predetermined period t1 by using the time constants of a depression transistor and a capacitor has the following disadvantage. When there are large variations in the characteristic of the depression transistor of the signal correction circuit, there is a possibility that the predetermined period t1 is made shorter than the start up time of the constant voltage circuit 24 because of the large characteristic variations of the depression transistor.

Figure 5:
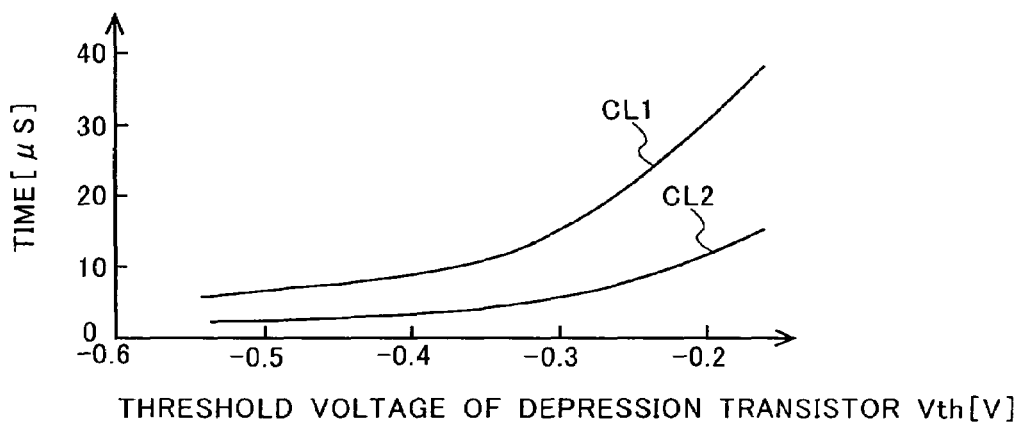
FIG. 5 is a graph showing the characteristics of the signal correction circuit and the constant voltage circuit using a depression transistor.

To prevent the disadvantage described above, the constant voltage circuit 24 may adopt a configuration provided with a constant current source using a depression transistor (e.g., a circuit configuration shown in FIG. 15). When the signal correction circuit 27 adopts the circuit configuration shown in FIG. 3 and the constant voltage circuit 24 adopts the circuit configuration shown in FIG. 15, it is possible to obtain the characteristic curve CL1 shown in FIG. 5 of the predetermined period t1 of the signal correction circuit 27 and the characteristic curve CL2 shown in FIG. 5 of the start up time of the constant voltage circuit 24. Thus, the predetermined period t1 is made longer than the start up time of the constant voltage circuit 24 unless the threshold voltage Vth of the depression transistor of the signal correction circuit 27 becomes extremely low and the threshold voltage Vth of the depression transistor of the constant voltage circuit 24 becomes extremely high.

Furthermore, by making the depression transistors of the signal correction circuit 27 and the constant voltage circuit 24 equal in size and arranging these depression transistors in the same direction, the threshold voltages Vth of the depression transistors of the signal correction circuit 27 and the constant voltage circuit 24 are made approximately equal. This makes it possible to prevent more reliably the predetermined period t1 from being made shorter than the start up time of the constant voltage circuit 24.

Note that the shorter the predetermined period t1, the better, for the following reasons. So long as the frequency of the brightness adjusting signal $V_{CTRL}$ is low, no problem arises. However, when the predetermined period t1 becomes equal to or longer than about one fourth of the cycle of the brightness adjusting signal $V_{CTRL}$ due to the high frequency of the brightness adjusting signal $V_{CTRL}$, the linearity between the duty of the brightness adjusting signal $V_{CTRL}$ and the brightness of the white light-emitting diodes LED1 to LED6 is lost. To solve this problem, it is preferable to use a signal correction circuit, as the signal correction circuit 27, that determines the predetermined period t1 by using the time constants of a depression transistor and a capacitor and can trim the depression transistor so that, when the predetermined period t1 is long, the predetermined period t1 is made shorter by trimming the depression transistor (by laser trimming or Zener zapping).

Figure 6:
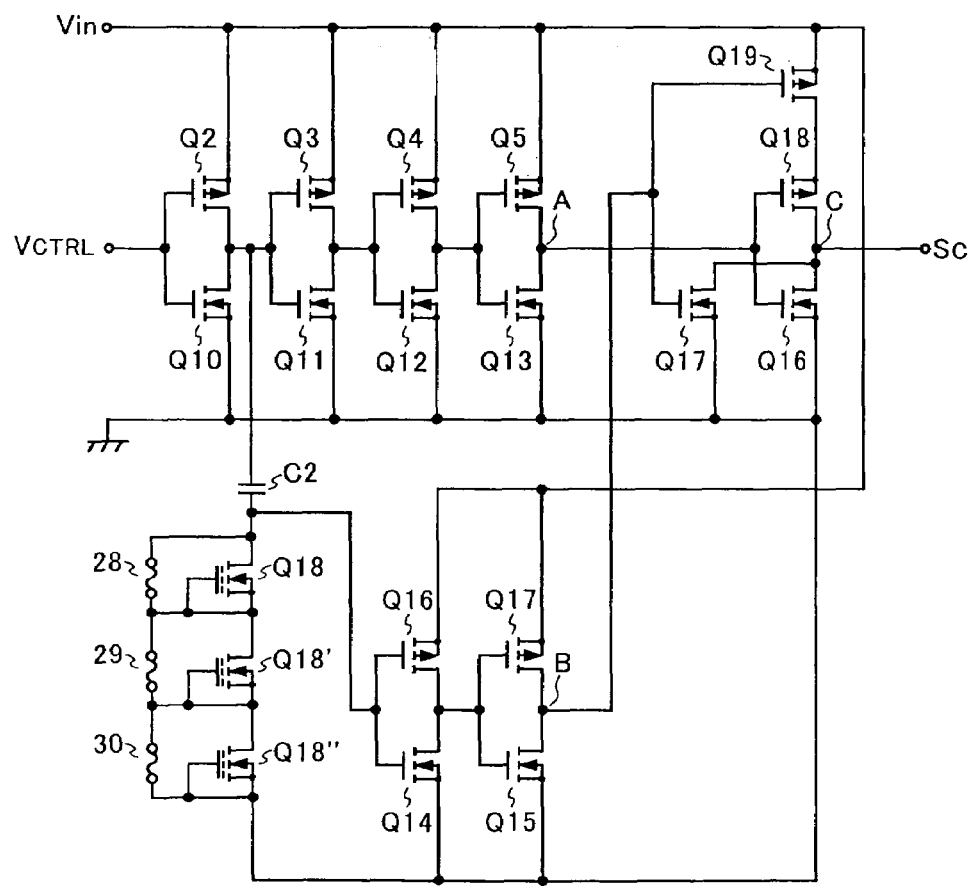
FIG. 6 is a diagram showing another example of the configuration of the signal correction circuit provided in the stepping-up switching power supply circuit shown in FIG. 1.

An example of the configuration of a signal correction circuit that determines the predetermined period t1 by using the time constants of a depression transistor and a capacitor and that can trim the depression transistor is shown in FIG. 6. Note that, in FIG. 6, such members as are found also in FIG. 3 will be identified with common reference characters, and their detailed descriptions will be omitted. In the signal correction circuit shown in FIG. 6, depression transistors Q18' and Q18" are connected in series to the depression transistor Q18, and trimming devices 28 to 30 are provided respectively between the gate and drain of the depression transistors Q18, Q18', and Q18".

When trimming is performed, it is necessary to measure the predetermined period t1 in a wafer test of the wafer on which the circuits of the stepping-up chopper regulator are formed, and adjust the predetermined period t1 according to the measurement results. The predetermined period t1 may be measured, for example, by obtaining the waveforms shown in FIG. 4 of the brightness adjusting signal $V_{CTRL}$ and the signal $S_C$. However, this method requires an expensive tester to obtain the signal waveforms.

On the other hand, when the oscillation circuit 15 adopts the circuit configuration provided with a constant current source using a depression transistor, it is possible to estimate the predetermined period t1 only by measuring the value of the oscillation frequency of the oscillation circuit 15. This eliminates the need to use an expensive tester. Thus, it is preferable that the oscillation circuit 15 adopts the circuit configuration provided with a constant current source using a depression transistor (e.g., a circuit configuration shown in FIG. 7).

Figure 7:
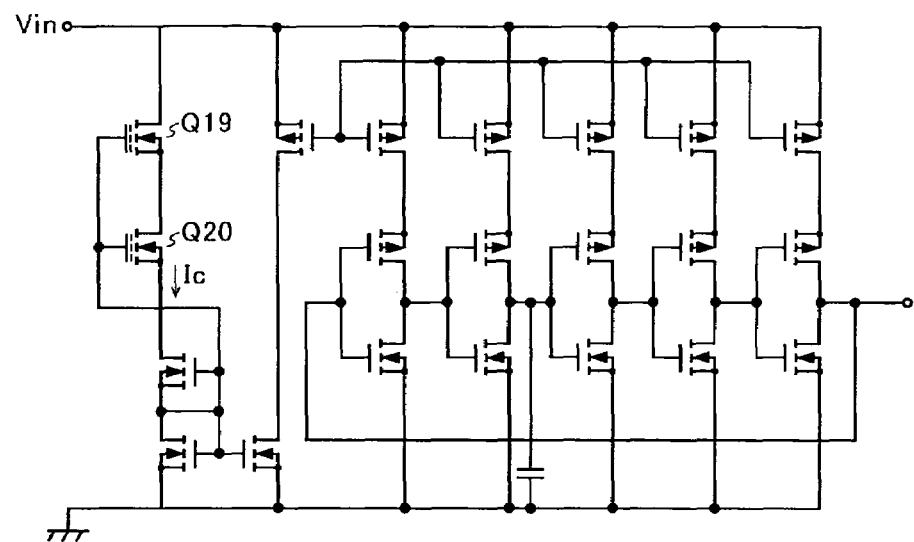
FIG. 7 is a diagram showing an example of the configuration of an oscillation circuit provided in the stepping-up switching power supply circuit shown in FIG. 1.
Figure 8:
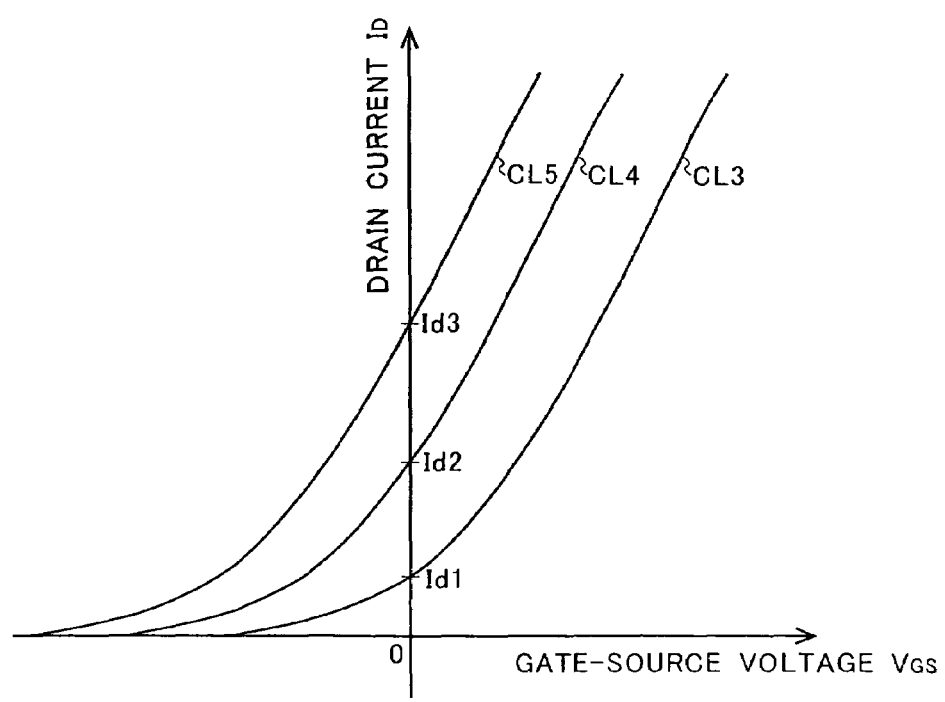
FIG. 8 is a graph showing the static characteristic of the depression transistor.

In the oscillation circuit shown in FIG. 7, the constant current source using depression transistors Q19 and Q20 outputs a constant current Ic. The depression transistors Q19 and Q20 have the static characteristics shown in FIG. 8. When the depression transistors Q19 and Q20 have the threshold voltage lower than the design value and have the static characteristic indicated by a characteristic curve CL3, the value of the constant current Ic is Id1. When the depression transistors Q19 and Q20 have the threshold voltage equal to the design value and have the static characteristic indicated by a characteristic curve CL4, the value of the constant current Ic is Id2. When the depression transistors Q19 and Q20 have the threshold voltage higher than the design value and have the static characteristic indicated by a characteristic curve CL5, the value of the constant current Ic is Id3. Specifically, in the oscillation circuit shown in FIG. 7, the lower threshold voltage the depression transistors Q19 and Q20 serving as the constant current source have, the smaller the constant current Ic becomes; the higher threshold voltage the depression transistors Q19 and Q20 serving as the constant current source have, the greater the constant current Ic becomes. As a result, in the oscillation circuit shown in FIG. 7, as shown in FIG. 9, the lower the threshold voltage Vth the depression transistors Q19 and Q20 serving as the constant current source have, the higher the oscillation frequency becomes; the higher the threshold voltage Vth the depression transistors Q19 and Q20 have, the lower the oscillation frequency becomes.

Figure 10:
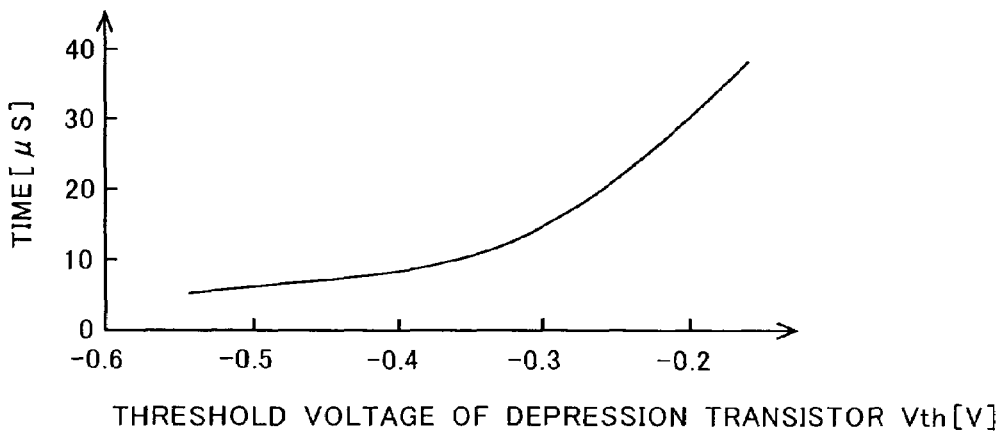
FIG. 10 is a graph showing the pre-trimming characteristic of the signal correction circuit shown in FIG. 6.

On the other hand, when the signal correction circuit 27 adopts the circuit configuration shown in FIG. 6, as seen in FIG. 10 showing the characteristic curve of the predetermined period t1 of the signal correction circuit 27, the lower the threshold voltage Vth the depression transistors Q18 to Q18" have, the shorter the predetermined period t1 becomes; the higher the threshold voltage Vth the depression transistors Q18 to Q18" have, the longer the predetermined period t1 becomes. Note that the characteristic curve shown in FIG. 10 of the predetermined period t1 of the signal correction circuit 27 is not yet trimmed.

Figure 9:
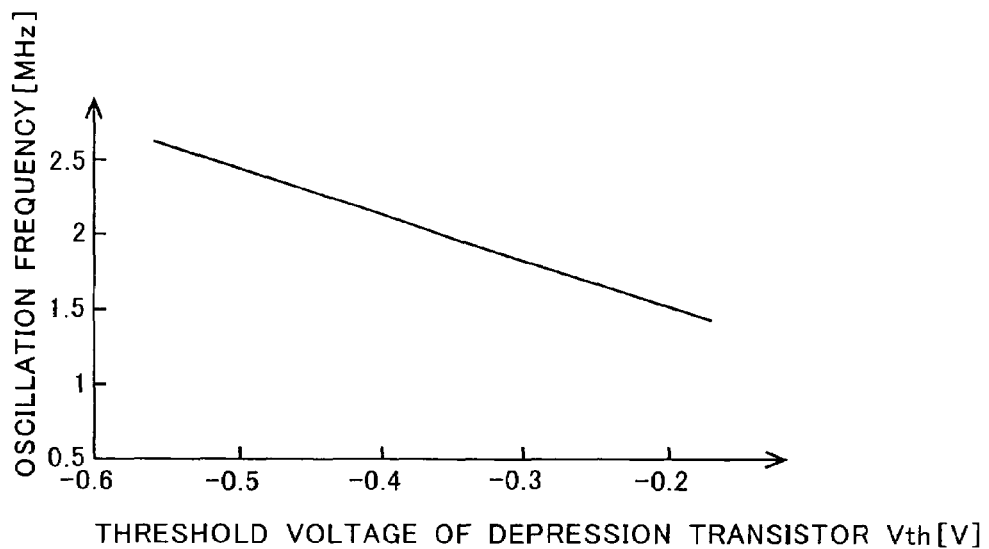
FIG. 9 is a graph showing the oscillation frequency characteristic of the oscillation circuit shown in FIG. 7.

Based on FIGS. 9 and 10, it is possible to estimate the predetermined period t1 of the signal correction circuit 27 only by measuring the value of the oscillation frequency of the oscillation circuit 15. By making the depression transistors of the oscillation circuit 15 and the signal correction circuit 27 equal in size and arranging these depression transistors in the same direction, the threshold voltages Vth of the depression transistors of the oscillation circuit 15 and the signal correction circuit 27 are made approximately equal. This enhances the accuracy of the estimation described above. Thus, it is preferable that the depression transistors of the oscillation circuit 15 and the signal correction circuit 27 are made equal in size and are arranged in the same direction.

Note that, the above description deals with a case where, when the corrected signal outputted from the signal correction circuit 27 takes a high level, the on/off circuit 21 makes the drive circuit 13 activate the switching control operation, and, when the corrected signal outputted from the signal correction circuit 27 takes a low level, the on/off circuit 21 makes the drive circuit 13 deactivate the switching control operation. It should be understood, however, that the drive circuit 13 may be made to activate the switching control operation when the corrected signal outputted from the signal correction circuit 27 takes a low level, and to deactivate the switching control operation when the corrected signal outputted from the signal correction circuit 27 takes a high level. In that case, the switch SW1 is turned off when a high level signal is fed to its control terminal and turned on when a low level signal is fed thereto, the switch SW2 is turned on when a high level signal is fed to its control terminal and turned off when a low level signal is fed thereto, and the switch 25 is turned off when a high level signal is fed to its control terminal and turned on when a low level signal is fed thereto. Furthermore, the above description deals with a case where the present invention is applied to a transformerless stepping-up switching power supply circuit. It should be understood, however, that the present invention can be applied to a stepping-up switching power supply circuit having a switching transformer.

Furthermore, an electronic apparatus according to the invention is provided with a load whose driving current has to be adjusted (e.g., an illumination light source of a liquid crystal display device) and a switching power supply circuit according to the invention that drives the load.

What is claimed is:

1. A switching power supply circuit comprising:
   a stepping-up DC-DC converter;
   a comparing portion;
   a driving portion:
   a constant voltage portion;
   a switching portion;
   an activating/deactivating portion; and
   a soft start circuit,
   wherein the comparing portion compares a reference voltage with a voltage based on an output current of the stepping-up DC-DC converter,
   wherein the driving portion performs switching control to turn on/off a switching device provided in the stepping-up DC-DC converter according to an output of the comparing portion,
   wherein the constant voltage portion feeds a constant voltage as a drive voltage at least to the comparing portion,
   wherein the switching portion switches constant voltage feeding operation of the constant voltage portion between an activated state and a deactivated state according to an external signal,
   wherein the activating/deactivating portion switches switching control operation of the driving portion between an activated state and a deactivated state according to the external signal, while preventing the switching control operation of the driving portion from being switched from the deactivated state to the activated state from a time point that the constant voltage feeding operation of the constant voltage portion is switched from the deactivated state to the activated state until a predetermined period elapses, and
   wherein the soft start circuit
      has a capacitance and a discharging portion, charges the capacitance when the switching control operation of the driving portion is started and thus an output voltage of the stepping-up DC-DC converter rises, controls the driving portion according to a voltage across the capacitance in such a way that, when the output voltage of the stepping-up DC-DC converter rises, the output voltage of the stepping-up DC-DC converter rises gently regardless of the output of the comparing portion, and makes the discharging portion discharge the capacitance when the switching control operation of the driving portion is in the deactivated state, completion of discharging of the capacitance requiring a period longer than a cycle with which the activating/deactivating portion switches the switching control operation of the driving portion between the activated state and the deactivated state.

2. The switching power supply circuit of claim 1,
wherein the external signal takes either an on level requesting activating and an off level requesting deactivating,
wherein the activating/deactivating portion includes a first signal generation portion, a second signal generation portion, and a third signal generation portion, and switches the switching control operation of the driving portion between the activated state and the deactivated state according to an output signal of the third signal generation portion,
wherein the first signal generation portion outputs an inverted signal of the external signal,
wherein the second signal generation portion outputs a signal that takes an on level from a time point that the external signal turns from an off level to an on level until the predetermined period elapses and that otherwise takes an off level, and
wherein the third signal generation portion outputs a signal that takes an off level requesting deactivating when, of output signals of the first and second signal generation portions, one takes an off level and the other takes an on level and that takes an on level requesting activating when, of the output signals of the first and second signal generation portions, both take an off level.

3. The switching power supply circuit of claim 1,
wherein the activating/deactivating portion includes a depression transistor and a capacitor, and determines the predetermined period by using time constants of the depression transistor and the capacitor.

4. The switching power supply circuit of claim 3,
wherein the constant voltage portion includes a constant current source, and a depression transistor is used as the constant current source.

5. The switching power supply circuit of claim 4,
wherein the depression transistor provided in the activating/deactivating portion and the depression transistor provided in the constant voltage portion are made equal in size and arranged in a same direction.

6. The switching power supply circuit of claim 3,
wherein the depression transistor provided in the activating/deactivating portion can be trimmed.

7. switching power supply circuit of claim 4,
wherein the depression transistor provided in the activating/deactivating portion can be trimmed.

8. The switching power supply circuit of claim 5,
wherein the depression transistor provided in the activating/deactivating portion can be trimmed.

9. The switching power supply circuit of claim 6,
wherein the driving portion includes an oscillation circuit, and a depression transistor is used as a constant current source in the oscillation circuit.

10. The switching power supply circuit of claim 7,
wherein the driving portion includes an oscillation circuit, and a depression transistor is used as a constant current source in the oscillation circuit.

11. The switching power supply circuit of claim 8,
wherein the driving portion includes an oscillation circuit, and a depression transistor is used as a constant current source in the oscillation circuit.

12. An electronic apparatus comprising:
a switching power supply circuit,
wherein the switching power supply circuit includes a stepping-up DC-DC converter, a comparing portion, a driving portion, a constant voltage portion, a switching portion, an activating/deactivating portion, and a soft-start circuit,
wherein the comparing portion compares a reference voltage with a voltage based on an output current of the stepping-up DC-DC converter,
wherein the driving portion performs switching control to turn on/off a switching device provided in the stepping-up DC-DC converter according to an output of the comparing portion,
wherein the constant voltage portion feeds a constant voltage as a drive voltage at least to the comparing portion,
wherein the switching portion switches constant voltage feeding operation of the constant voltage portion between an activated state and a deactivated state according to an external signal,
wherein the activating/deactivating portion switches switching control operation of the driving portion between an activated state and a deactivated state according to the external signal, while preventing the switching control operation of the driving portion from being switched from the deactivated state to the activated state from a time point that the constant voltage feeding operation of the constant voltage portion is switched from the deactivated state to the activated state until a predetermined period elapses, and
wherein the soft start circuit
has a capacitance and a discharging portion,
charges the capacitance when the switching control operation of the driving portion is started and thus an output voltage of the stepping-up DC-DC converter rises,
controls the driving portion according to a voltage across the capacitance in such a way that, when the output voltage of the stepping-up DC-DC converter rises, the output voltage of the stepping-up DC-DC converter rises gently regardless of the output of the comparing portion, and
makes the discharging portion discharge the capacitance when the switching control operation of the driving portion is in the deactivated state, completion of discharging of the capacitance requiring a period longer than a cycle with which the activating/deactivating portion switches the switching control operation of the driving portion between the activated state and the deactivated state.

13. The electronic apparatus of claim 12,
wherein the external signal takes either an on level requesting activating and an off level requesting deactivating, wherein the activating/deactivating portion includes a first signal generation portion, a second signal generation portion, and a third signal generation portion, and switches the switching control operation of the driving portion between the activated state and the deactivated state according to an output signal of the third signal generation portion, wherein the first signal generation portion outputs an inverted signal of the external signal, wherein the second signal generation portion outputs a signal that takes an on level from a time point that the external signal turns from an off level to an on level until the predetermined period elapses and that otherwise takes an off level, and wherein the third signal generation portion outputs a signal that takes an off level requesting deactivating when, of output signals of the first and second signal generation portions, one takes an off level and the other takes an on level and that takes an on level requesting activating when, of the output signals of the first and second signal generation portions, both take an off level.

14. The electronic apparatus of claim 12, wherein the activating/deactivating portion includes a depression transistor and a capacitor, and determines the predetermined period by using time constants of the depression transistor and the capacitor.

15. The electronic apparatus of claim 12, further comprising:

a liquid crystal display device, wherein the switching power supply circuit drives an illumination light source of the liquid crystal display device.

16. The electronic apparatus of claim 13, further comprising:

a liquid crystal display device, wherein the switching power supply circuit drives an illumination light source of the liquid crystal display device.

17. The electronic apparatus of claim 14, further comprising:

a liquid crystal display device, wherein the switching power supply circuit drives an illumination light source of the liquid crystal display device.

* * * * *